US011487128B2

(12) United States Patent
Keller

(10) Patent No.: US 11,487,128 B2
(45) Date of Patent: Nov. 1, 2022

(54) APPARATUS FOR BEAM SHAPING THE PULSED LASER EMISSION OF A REMOTE SENSING OPERATING AT WAVELENGTHS IN THE RETINAL HAZARD REGION

(71) Applicant: FASTREE3D SA, Ecublens (CH)

(72) Inventor: Stefan Thomas Keller, Le Mont-sur-Lausanne (CH)

(73) Assignee: Fastree3D SA, Ecublens (CH)

( * ) Notice: Subject to any disclaimer, the term of this patent is extended or adjusted under 35 U.S.C. 154(b) by 534 days.

(21) Appl. No.: 16/493,035

(22) PCT Filed: Mar. 16, 2017

(86) PCT No.: PCT/EP2017/056321
§ 371 (c)(1),
(2) Date: Sep. 11, 2019

(87) PCT Pub. No.: WO2018/166609
PCT Pub. Date: Sep. 20, 2018

(65) Prior Publication Data
US 2020/0012113 A1   Jan. 9, 2020

(51) Int. Cl.
*G01N 27/14* (2006.01)
*G02B 27/09* (2006.01)
(Continued)

(52) U.S. Cl.
CPC ......... *G02B 27/0916* (2013.01); *G01N 21/17* (2013.01); *G01S 7/4817* (2013.01);
(Continued)

(58) Field of Classification Search
CPC ...... G02B 5/02; G02B 27/0916; G02B 27/20; G01N 27/17; G01N 2021/1793; G01S 7/4817
See application file for complete search history.

(56) References Cited

U.S. PATENT DOCUMENTS 4,453,806 A   6/1984 Wick
5,451,765 A * 9/1995 Gerber ............... B23K 26/0643
219/121.62

(Continued)

FOREIGN PATENT DOCUMENTS

EP         3115815 A1   1/2017
WO      2016067275 A1   5/2016

*Primary Examiner* — Kevin K Pyo
(74) *Attorney, Agent, or Firm* — Browdy and Neimark, P.L.L.C.

(57) ABSTRACT

The invention relates to a remote sensing device comprising a detector with a predefined field of view (FOV); and an emitter emitting pulses of light with an overall divergence angle $\theta_{div}$ in the retinal hazard region which further comprises at least one diffuser wherein the divergence angle after the diffuser is $\theta_0$; and at least one lens configured to transform the light from said diffuser to a determined divergence angle matching the FOV of the detector, or to a virtual image of predefined size appropriate in magnitude given the divergence in order to ensure the most restrictive position regarding eye-safety to be at the same position for pulsed and (quasi-)continuous wave operation; and to emit the transformed light. The invention further discloses a smartphone comprising such a remote sensing device characterized by its improved eye-safety properties for myopic people.

18 Claims, 2 Drawing Sheets

(51) Int. Cl.
*G01N 21/17* (2006.01)
*G01S 7/481* (2006.01)
*G02B 5/02* (2006.01)
*G02B 27/20* (2006.01)

(52) U.S. Cl.
CPC ............... *G02B 5/02* (2013.01); *G02B 27/20* (2013.01); *G01N 2021/1793* (2013.01)

(56) References Cited

U.S. PATENT DOCUMENTS

| | | |
|---|---|---|
| 7,232,240 B2 | 6/2007 | Kosnik et al. |
| 2005/0213180 A1 | 9/2005 | Lopez-Hernandez et al. |
| 2006/0039160 A1 | 2/2006 | Cassarly et al. |
| 2016/0026838 A1 | 1/2016 | Gillet et al. |

\* cited by examiner

APPARATUS FOR BEAM SHAPING THE PULSED LASER EMISSION OF A REMOTE SENSING OPERATING AT WAVELENGTHS IN THE RETINAL HAZARD REGION

TECHNICAL FIELD

The present invention relates to a remote sensing device whose emitter is designed in such a way that the for eye-safety relevant most restrictive position is independent on whether the device works in pulsed or (quasi-)continuous wave operation.

PRIOR ART

Remote sensing refers to a method to acquire information about certain properties of a target under investigation, without being in physical contact with said target. There are active and passive methods, depending on whether the target is actively irradiated by the remote sensing device in order to acquire said information, or not. An active remote sensing device generally consists of an emitter to irradiate said target and a detector to detect the reflected and/or back scattered radiation off said target. The performance of such an active remote sensing device is thus given by the detection sensitivity of the detector and the power of the emitted radiation. The power of the emitted radiation is constrained by technical limitations, and/or emission regulations. For active remote sensing devices using laser light as source of radiation said emission regulations are given by IEC 60825-1: 2014, "Safety of laser products—Part 1: Equipment classification and requirements," Edition 3, 2014.

According to the aforementioned laser regulation the spectral region 400 nm<$\lambda$≤1400 nm is called the retinal hazard region: the cornea, lens of the eye, and liquid inside the eye are transparent for radiation of this spectral region. Such radiation thus can reach the retina. Namely, the apparent source of the laser emission is imaged via the eye onto the retina. If this apparent source is a point source, the whole emission is concentrated into said image of this point source. If the apparent source is of extended size, also the resulting retinal image is extended, and the laser emission is distributed over this extended image. Permanent injuries can occur if the imaged emission has a high enough energy density.

For this reason the stated laser regulation limits the accessible emission of laser devices depending on the wavelength $\lambda$ of the emission, the subtended size of the apparent source $\alpha$, and the pulse durations $t_p$ within the pulse trains composing said emission.

If the laser source emits with a certain divergence $\theta$ only a fraction of the total emission is accessible by the limiting aperture of the eye; this fraction reduces further with farther distance from the laser source. Based on this idea Suzuki et al. EP3115815 have disclosed an optical connector providing enhanced eye-safety properties.

The subtended size $\alpha$ of the apparent source is not necessarily given directly by the original source of the emission. It can be, for example, the beam waist of a focused beam, the emission from a diffuser, or a virtual image of the source, etc. As such, finding the exact place and size of the apparent source can be difficult, a more in-depth treatment of the problem is for example given in K. Schulmeister, "'The Apparent Source'—A Multiple Misnomer," ILSC conference proceedings, p. 91-98, 2005. In applications employing a diffuser, this diffuser can often be seen as the apparent source. Diffusers are typically used for speckle reduction, for example, in laser projectors. As an example, in E. Buckley, "Eye-safety analysis of current laser-based LCOS projection systems," J. of the SID 18(12), 2010, doi: 10.1889/JSID18.12.1051 they present an eye-safety analysis of a laser projector using a diffuser as a means for speckle reduction. Beside speckle reduction, diffusers can be used to realize a so called extended source, characterized by a large $\alpha$. Such extended sources have an increased accessible emission limit (AEL). This is exploited in, for example, Kosnik et al. U.S. Pat. No. 7,232,240.

DISCLOSURE OF THE INVENTION

It is the aim of the present invention to provide a remote sensing device whose emitter is designed in such a way that the for eye-safety relevant most restrictive position is independent on whether the device works in pulsed or (quasi-) continuous wave operation.

According to the present invention, the aforementioned aim is achieved by means of a remote sensing device comprising
  a detector with a predefined field of view (FOV); and
  an emitter emitting pulses of light with an overall divergence angle $\theta_{div}$ in the retinal hazard region which further comprises
  at least one diffuser wherein the divergence angle after the diffuser is $\theta_0$; and
  at least one lens configured to transform the light from said diffuser to a determined divergence angle matching the FOV of the detector, or to a virtual image of predefined size appropriate in magnitude given the divergence in order to ensure the most restrictive position regarding eye-safety to be at the same position for pulsed and (quasi-)continuous wave operation; and to emit the transformed light.

Preferably, the overall divergence angle $\theta_{div}$ of the emitter is equal to the divergence angle $\theta_0$ after the diffuser.

Moreover, the detector consists of a photo-sensitive element and a lens stack.

Said photo-sensitive element is a CCD camera and/or a CMOS camera and/or a SPAD-based detector and/or an APD-based detector and/or a SiPM-based detector.

Said lens is a spherical lens and/or an aspherical lens and/or a lens made up of a grid of micro-lenses and/or a Fresnel lens.

Advantageously, the diffuser presents a divergence angle after the diffuser $\theta_0 > 53° = 0.93$ rad.

Moreover, it further comprises at least one additional lens positioned between the emitter and the diffuser.

Said additional lens is a concave and/or convex lens.

Said emitter consists of a laser which emits at least one wavelength corresponding to the retinal hazard region 400 nm<$\lambda$≤1400 nm.

Another object of the present invention concerns a smartphone comprising a remote sensing device further comprising
  a detector with a predefined field of view (FOV); and
  an emitter emitting pulses of light with an overall divergence angle $\theta_{div}$ in the retinal hazard region which further comprises
  at least one diffuser wherein the divergence angle after the diffuser is $\theta_0$; and
  at least one lens configured to transform the light from said diffuser to a determined divergence angle matching the FOV of the detector, or to a virtual image of predefined size appropriate in magnitude given the divergence in order to ensure the most restrictive position regarding eye-safety to be at the same position for pulsed and (quasi-)continuous wave operation; and to emit the transformed light;

wherein said emitter provides means for eye-safety such that myopic people are not endangered.

Preferably, the overall divergence angle $\theta_{div}$ of the emitter is equal to the divergence angle $\theta_0$ after the diffuser.

Moreover, the detector consists of a photo-sensitive element and a lens stack.

Said photo-sensitive element is a CCD camera and/or a CMOS camera and/or a SPAD-based detector and/or an APD-based detector and/or a SiPM-based detector.

Said lens is a spherical lens and/or an aspherical lens and/or a lens made up of a grid of micro-lenses and/or a Fresnel lens.

Advantageously, the diffuser presents a divergence angle after the diffuser $\theta_0 > 53° = 0.93$ rad.

Moreover, it further comprises at least one additional lens positioned between the emitter and the diffuser.

Said additional lens is a concave and/or convex lens.

Said emitter consists of a laser which emits at least one wavelength corresponding to the retinal hazard region 400 nm $< \lambda \leq 1400$ nm.

BRIEF DESCRIPTION OF THE DRAWINGS

The invention will be further elucidated by means of the following description and the appended drawings.

DESCRIPTION OF PREFERRED EMBODIMENTS

Figure 1:
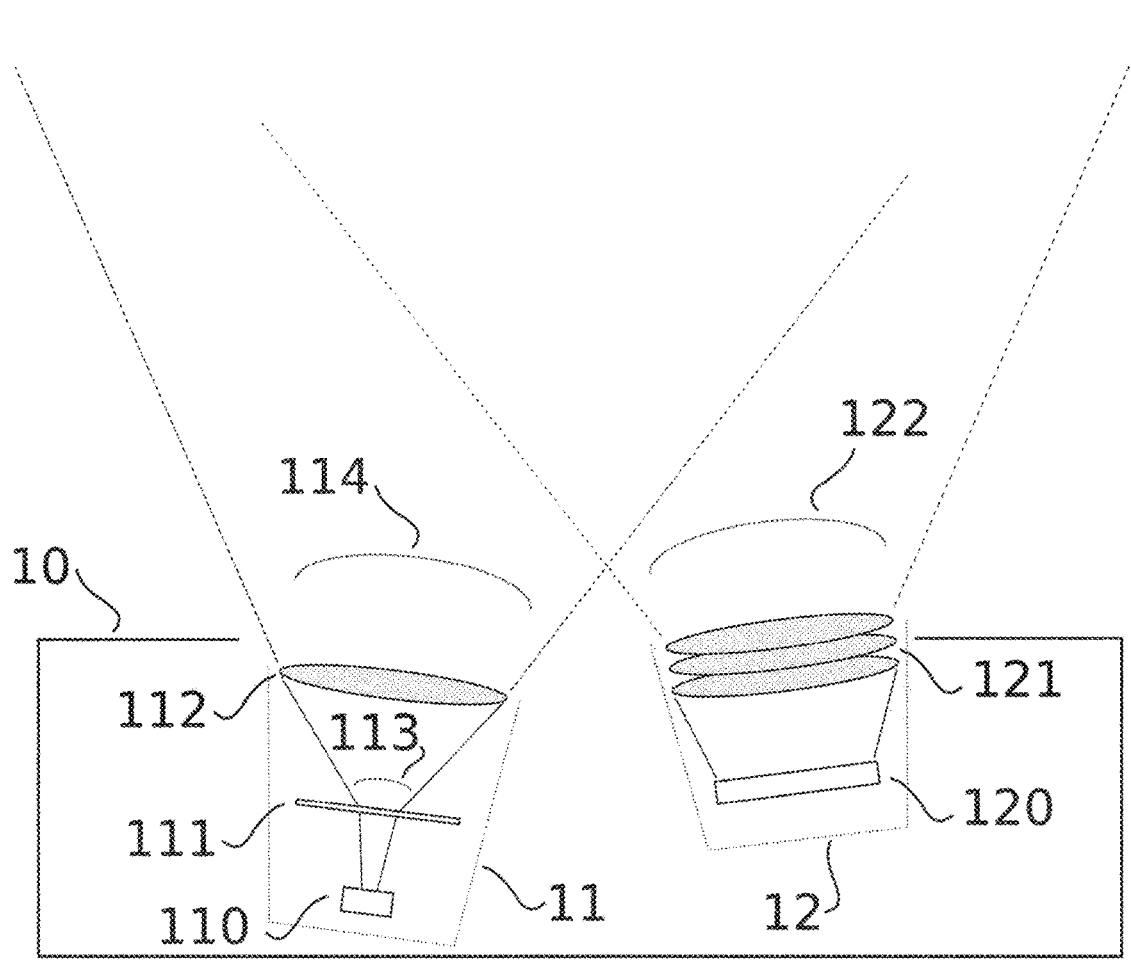
FIG. 1 is a depiction of an embodiment of the present invention.

The present invention will be described with respect to particular embodiments and with reference to certain drawings. The invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein. The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

The performance of an active remote sensing device is given by the detection sensitivity of the detector and the power of the emitted radiation. The power of the emitted radiation is constrained by technical limitations, and/or emission regulations. Of these two constraints the regulatory power limits tend to be more restrictive given the current state of technology. For active remote sensing devices using laser light as source of radiation said emission regulations are given by IEC 60825-1:2014, "Safety of laser products—Part 1: Equipment classification and requirements," Edition 3, 2014.

The laser classification requires a safety analysis following aforementioned regulation. This safety analysis has to consider the laser emission at the most restrictive position, in the most restrictive situation. According to the most restrictive position and situation the regulation defines accessible emission limits (AEL) for each laser class. If a laser device at hand emits with lower power and/or energy than the AEL allows for a certain laser class, said laser device can be classified with this class; otherwise, a higher class has to be considered. The AELs depend on the wavelength of the emission $\lambda$, the pulse durations $t_p$, and the size of the irradiated area on the retina, expressed as subtended angle $\alpha$; called the apparent size. Generally speaking, the larger the retinal images, the higher the AEL; the same holds for longer wavelengths.

For a divergent emission in the retinal hazard region with divergence angle $\theta$ the analysis of the most restrictive position in the most restrictive situation poses some non-trivial difficulties: first of all, because of the divergence only a fraction of the total emission is accessible by the limiting aperture of the eye. This fraction of the emission potentially entering the eye reduces further with farther distance from the laser source. However, close distances are not necessarily more restrictive: a regular human eye is able to produce a sharp image for objects at a distance of at least L=10 cm. Objects closer than this distance appear as blurry. A blurry image of an emitter on the retina represents a larger $\alpha$, and thus a higher emission limit. As a result, for divergent laser sources the most restrictive position, typically, is at $L^{(restrict)}$ 10 cm from the source. This idea is implied in, for example, Suzuki et al. EP3115815, wherein they have disclosed an optical connector providing enhanced eye-safety properties. If the beam profile shows strong asymmetries and/or the side-lopes are of significantly higher magnitude—i.e. if it is not Gaussian- or Lorentzian-like a more complicated argument may apply thus displacing said most restrictive position.

Laser safety historically has regulated lasers used in industry, research, and military; manipulated by trained and/or supervised personnel. Within this context the statement that a regular human eye is able to produce a sharp image for objects at a distance of at least L=10 cm was appropriate. With the advent of exposed lasers in every-day objects such as smartphones—wherein they're used, for example, in order to scan iris and/or face for user recognition—additional safety considerations beside the strict AEL values have to be accounted for. Namely, some people—so-called myopes or myopic persons—are indeed able to focus at closer range than the standard 10 cm. For such people a laser device that is considered save according to the regulation can in fact pose a hazard. Consequentially, divergent point sources for every day objects such as smartphones cannot benefit from higher emission limits thanks to the divergence. Hence, the emission is limited to the amount of a collimated emission.

The stated laser safety regulation knows a certain thermal confinement time $T_i$, which takes into account the tissue reaction time. Laser pulses emitted during $T_i$ have to be considered as one single pulse of corresponding duration and pulse energy equal to the summed up energy of the single pulses. In fiber communication, for example, the laser transmission, typically, happens in the form of continuously emitted pulses, with a duration between pulses much shorter than this $T_i$. The emission of these cases—and thus relevant for EP3115815—can be considered as (quasi-)continuous wave, instead of pulsed. The above argument to find the most restrictive position of a divergent laser source at $L^{(restrict)}$=10 cm applies as such only for (quasi-)continuous wave emission.

In a remote sensing application a pulsed emission can present advantages over a (quasi-)continuous wave emission. For example, between two subsequent acquisitions said remote sensing system will likely have to process and/or read-out data. During this time said remote sensing system cannot sense. Consequentially, it would make sense to turn off the laser emission during this time, in order to, for example, reduce the power consumption of the system; this leads to a pulsed emission profile. Another reason can be to optimize the use of the available emission power budget: the off-time during which the remote sensing system doesn't emit light allows the on-time during which the remote sensing system does emit light to emit at a higher amplitude in order to end up with the same average power. For example, given an extended source of $\alpha$=100.1 mrad emitting at $\lambda$=700 nm the limiting average power emission is P=14.7 mW. Within a time span of t p=100 ms such an average power limited source emits an energy of Q=1.47 mJ. Instead of emitting, and detecting, continuously, said remote sensing device could emit and detect in time segments of duration $t_{on}$=50 ms, during which time the source could emit the same amount of energy—i.e. the emission would consist of rectangular pulses with peak power twice the value of the average limit. Such an operation would represent a lower activity duty-cycle for the remote sensing device, which would likely lead to a lower power consumption; while having available the same amount of light.

Given the explanation above, it should be obvious these pulses—considered as pulses according to the laser safety regulation—of duration $t_p$ can themselves be composed of many shorter pulses with a pulse repetition rate (PRR) $f_{PRR} \geq 1/T_i$; said shorter pulses thus not considered individual pulses according to the laser safety regulation.

The stated laser safety regulation knows a so-called additivity criterion for multiple pulses emitted by medium sized laser sources with apparent source size 5 mrad<$\alpha$≤100 mrad. This is accounted for through correction factor $C_5$, which one has to factor in to calculate the permitted single pulse peak energy (or power, respectively) limit. Namely, correction factor $C_5$ depends on the number of pulses emitted within a certain time breakpoint $T_2$. This time breakpoint $T_2$ accounts for involuntary eye-movements. Exposures of durations t>$T_2$ will be irradiated on different sites on the retina so that $T_2$ is the maximum exposure duration one needs to consider to assess pulse trains. Breakpoint $T_2$ depends on $\alpha$ since, given a larger apparent source, more involuntary eye-movements have to be included and thus the longer $T_2$ has to be to consider different sites of the retina to have been irradiated. The number N of pulses emitted during $T_2$, assuming a constant pulse repetition rate (PRR) $f_{PRR}$, results as N=$f_{PRR}T_2$. By defining a characteristic time $$t_\alpha = \left(\frac{\min(\max(5\ mrad, \alpha), 100\ mrad)}{200\ mrad}\right)^2$$

the $C_5$ correction factor can be written for pulses from a laser source with apparent size 5 mrad<$\alpha$≤100 mrad of pulse duration $t_\alpha \leq t_p \leq$ 0.25 s as $C_5$=max($N^{-1/4}$, 0.4), and for pulses of duration $T_i<t_p<t_\alpha$ as $C_5$=max($N^{-1/4}$, 0.2).

For large sources $\alpha$>100 mrad correction factor $C_5$ doesn't apply, or can be set $C_5$=1, respectively. A laser source of a certain size $x_{src}$ can appear as $\alpha$=$x_{src}$/L>100 mrad at L=10 cm, for example. At this most restrictive position for a continuous wave emission hence also a pulsed emission does not have to account for $C_5$. However, there is a second position, with distance L'>L from the source at which $\alpha$=$x_{src}$/L'=100 mrad. At this L' the accessible emission limit (AEL) posed for the pulse peak energy (or power, respectively) will drop by as much as factor 5 (1/0.2=5). Because of this reduced AEL the position at L'=$L^{(restrict)}$= $x_{src}$/2 tan(100 mrad/2) tends to become the most restrictive position in pulsed operation.

In other words, a large laser source presents different distances corresponding to where the most restrictive position is, depending on whether the emission is pulsed or (quasi-)continuous wave. In the case the remote sensing device operates with a pulsed emission in order to increase the allowed emission amplitude during the on-time because of the off-time, as indicated in an example above, the average power of this pulsed emission may drop by up to a factor 5 because of the drop in correction factor $C_5$. This defeats at least partially the above mentioned benefit of working in pulsed operation. This situation is particularly inconvenient for divergent laser devices that can be operated in both pulsed and (quasi-)continuous wave. Namely, the solution provided in EP3115815—to adjust the divergence of the laser source such that the amount of power entering the eye at $L^{(restrict)}$ is below AEL—would be difficult to implement if one has to consider a pulsed and a (quasi-) continuous wave emission for the same device. On the other hand, following the argument presented in EP3115815 higher divergence can be considered as generally more safe, there is no real need for the divergence to equate AEL at $L^{(restrict)}$. In a remote sensing application, however, the divergence of the emission side $\theta_{div}$ is supposed to match the field of view (FOV) or acceptance angle $\beta_{FOV}$ of the detection side; so that $\theta_{div}$ cannot be increased arbitrarily.

With reference to FIG. 1 one embodiment of the present invention is an active remote sensing system (10) composed of at least two components: an emitter (11, and a detector (12). Said emitter (11) further consists of a laser (110), which emits at least one wavelength corresponding to the retinal hazard region 400 nm<$\lambda$≤1400 nm; a diffuser (111); and a lens (112). This laser (110) can be any type of laser such as, for example, vertical-cavity surface-emitting lasers (VCSELs), vertical-external-cavity surface-emitting lasers (VECSELs), edge-emitters, gas lasers, fiber laser, and/or dye lasers. The laser (110) emits with a native divergence angle $\theta_{laser}$. Laser (110) has a native size of $x_{laser}$, if it cannot be considered a point source. The diffuser (111) can be, for example, as discussed in T. R. M. Sales, "Efficient and uniform illumination with microlens-based band-limited diffusers," Photonics Spectra April 2010 https://www.photonics.com/Article.aspx?AID=41972, E. R. Méndez et al., "Photofabrication of random achromatic optical diffusers for uniform illumination," Appl. Opt., 40(7, 2001 doi: 10.1364/AO.40.001098, and/or as disclosed in Pflibsen et al. U.S. Pat. No. 5,303,084, etc. The diffuser (111) has a certain scattering angle $\theta_{scat}$. The lens (112) can be, for example, a spherical lens, an aspherical lens, a lens made up of a grid of micro-lenses, a Fresnel lens, etc. The lens (112) has a certain focal length f and is positioned with distance g from diffuser (111). We further denote the distance between laser (110) and diffuser (111) as h, and the divergence angle after the diffuser as $\theta_0$ (113). The combination of $\theta_0$, f, and g result in an overall divergence angle of emitter (11) of $\theta_{div}$ (114).

The detector (12) further consists of a photo-sensitive element (120), and a lens stack (121). The photo-sensitive element (120) can be, for example, a CCD camera, a CMOS camera, a SPAD-based detector, an APD-based detector, and/or a SiPM-based detector. It should be obvious that this photo-sensitive element (120) has to be adapted for the chosen wavelength of the laser (110). As such, silicon based detectors (such as CMOS or SiPM) wouldn't work for wavelength about $\lambda$>1100 nm, as silicon is transparent in this spectral range. For this spectral range germanium—or other semiconductor compounds such as InGaAs, etc.—based detectors could be used, for example. The detector could further comprise a wavelength converter, in order to again be able to use, for example, a silicon based detector. Such a wavelength converter is, for example, disclosed by Ben-Bassat et al. WO2016067275. The lens stack (121) can be composed of lenses of aforementioned characteristics. It results in a certain field of view (FOV), or acceptance angle, $\beta_{FOV}$ (122).

The divergence angle $\theta_{div}$ and the FOV $\beta_{FOV}$ are such that they correspond to each other. This is typically achieved by first choosing a $\beta_{FOV}$ appropriate for the targeted remote sensing application. Secondly, $\theta_{div}$ is chosen such that the irradiated area matches the probed area from a certain target distance on. Due to parallax between emitter (11) and detector (12) said overlap is poor for close distances and improves—i.e. tends to 1—for further ranges. As such, the solution provided by EP3115815 could be applied only in some fringe cases; wherein $\beta_{FOV}$ happens to match the required $\theta_{div}$ of the emitter.

In this embodiment, the most restrictive position is given by the discontinuity in correction factor $C_5=1\to0.2$ at the position where the apparent size of the source crosses the critical subtended angle of 100 mrad. As stated above, this is given at $L^{(restrict)}=x_{src}/2\tan(100\,\mathrm{mrad}/2)$, with $x_{src}$ the size of the laser source. One way not to be affected by the discontinuity in correction factor $C_5$ is to adapt the divergence of the emitter (11) such that at $L^{(restrict)}$ only a fraction equivalent to $C_5$ of the emitted power can enter the eye; as defined by the $d_{eye}=7$ mm diameter pupil. This requirement wouldn't be well-defined, as $C_5$ depends on the pulse duration $t_p$, and on the number of pulses within time breakpoint $T_2$. However, for the relevant $\alpha=100$ mrad it is $T_2=100$ s, and $t_{100\,mrad}=0.25$ s. Correspondingly, for a pulse repetition rate higher than $f_{PRR}\geq6.25$ Hz it is always $C_5=0.2$. We thus look for a configuration such that the $d_{eye}=7$ mm diameter pupil represents 0.2 of the whole diameter D of the beam. Or, in other words, we're looking for a divergence $\theta_{div}$ such that the beam diameter at $L^{(restrict)}$ is $D=5\,d_{eye}$. Pulse repetition rate $f_{PRR}\geq6.25$ Hz is a rather low value; most remote sensing applications will work with higher pulse repetition rates, so that we can consider the constant value $C_5=0.2$. Of course, if a special design requirement limits the pulse repetition rate of a given remote sensing application to a value lower than these 6.25 Hz, the corresponding minimum correction factor can be used for the present discussion. The divergence hence would have to be $$\theta_{div} \geq 2\arctan\left(\frac{5d_{eye}-x_{src}}{2L^{(restrict)}}\right).$$

However, adapting the divergence for increased eye-safety properties follows the spirit of disclosure EP3115815. As already discussed, this strategy isn't feasible for a remote sensing application. Instead, in a first embodiment of the present invention the size of the source $x_{src}$ is adapted by choosing the distance h between laser (110) and diffuser (111) such that $$h = \frac{x_{src}-x_{laser}}{2\tan(\theta_{laser}/2)}. \quad (\text{Eq. 1})$$

This distance h is set following relation (Eq. 1) in order to obtain a $x_{src}$, given a target divergence $\theta_{div}$, as $$2h\tan(\theta_{laser}/2)+x_{laser}=x_{src}\geq\frac{5d_{eye}}{1+\tan\left(\frac{\theta_{div}}{2}\right)/\tan\left(\frac{100\,mrad}{2}\right)}. \quad (\text{Eq. 2})$$

The size of $x_{src}$ as given by (Eq. 2) ensures that the most restrictive position $L^{(restrict)}$, defined by the crossing of $\alpha=100$ mrad, is located at a distance from the source at which place the amount of optical power that can enter the eye is low enough not to be affected by the discontinuity in correction factor $C_5$. Consequentially, the most restrictive position for this laser device is the same for pulsed and continuous wave operation. Therefore, the average power of the pulsed operation is the same of the average of the continuous wave operation. Additionally, the size of $x_{src}$ as given by (Eq. 2) ensures that the most restrictive position $L^{(restrict)}$ is identical for myopic people able to focus at closer objects than normal-sighted persons. This property is important, for example, for consumer devices such as smartphones which have to be safe for use beyond what is covered by the laser regulations alone.

From (Eq. 2) we see that a larger $x_{src}$ and thus larger h generally tends to be better in terms of ability to avoid the discontinuity in correction factor $C_5$, and eye-safety considerations overall. However, a remote sensing application typically favors a compact design and/or an optimization in terms of bill of material. Consequentially, increasing the size of the source arbitrarily doesn't make sense. Instead, lens (112) allows the present embodiment both to improve with regard to compactness and with respect to costs.

Generally speaking, a lens with focal length f projects an object at distance g from the lens onto an image at distance b from the lens with the relation $$\frac{1}{f}=\frac{1}{g}+\frac{1}{b}.$$

Said image at b is magnified by factor M with respect to the size of the original object at g as $M=|b/g|$, or expressed differently $$\frac{1}{M} = 1 - \frac{g}{f}, \quad \text{(Eq. 3)}$$

$$\Rightarrow g = f\left(1 - \frac{1}{M}\right).$$

Beside the magnification also the divergence of the beam changes due to the lens, as can be shown for example by means of a ray transfer matrix analysis $$\begin{pmatrix} x_1 \\ \theta_1 \end{pmatrix} = M_{lens} M_{freespace} \begin{pmatrix} x_{src} \\ \theta_0 \end{pmatrix} = \begin{pmatrix} 1 & 0 \\ -1/f & 1 \end{pmatrix} \begin{pmatrix} 1 & g \\ 0 & 1 \end{pmatrix} \begin{pmatrix} x_{src} \\ \theta_0 \end{pmatrix},$$

which results in a divergence exiting the lens of $$\theta_1 = \theta_0\left(1 - \frac{g}{f}\right). \quad \text{(Eq. 4)}$$

As we compare (Eq. 3) with (Eq. 4) we recognize an inverse relation between change in divergence and magnification $$\frac{\theta_1}{\theta_0} = \frac{1}{M}.$$

This relation allows the present embodiment to optimize cost and compactness of the remote sensing application as follows. Engineered diffusers allow to obtain large scatter or output angles ($\theta_0$ in the present notation). We can reduce a large scatter or output angle $\theta_0$ to a needed emitter divergence $\theta_{div}$ corresponding to $\beta_{FOV}$ using lens (112). In order to achieve this we have to position lens (112) at distance g according to (Eq. 3). Magnification M is given by the ratio between $\theta_0$ and the targeted $\eta_{div}$. The apparent source of this embodiment is represented by the virtual image of the laser emission onto diffuser (111). This virtual image is magnified by factor M compared to the area illuminated by laser (110) on diffuser (111). This allows to use such a diffuser (111) with a relatively small cross section, and still obtain a source size satisfying (Eq. 2).

The size of the cross section of diffuser (111) is a key cost driver of this component. Since the present embodiment can instead work with a magnified virtual image of this diffuser (111), cost can be optimized considerably. Beside the physical dimensions of the used equipment another cost aspect is typically to what extend economies of scale can be exploited. From this point of view it can be more economically viable to use the same diffuser producing a high $\theta_0 > 53° = 0.93$ rad and to adapt the divergence $\theta_{div}$ by adapting distance g for different products in a whole product line. Furthermore, the combination of a high divergence diffuser (111), i.e. a diffuser with $\theta_0 > 53° = 0.93$ rad, and a lens (112) allows to design the emitter (11) more compact than by increasing distance h and use a diffuser with a target $\theta_0 = \theta_{div}$.

Figure 2:
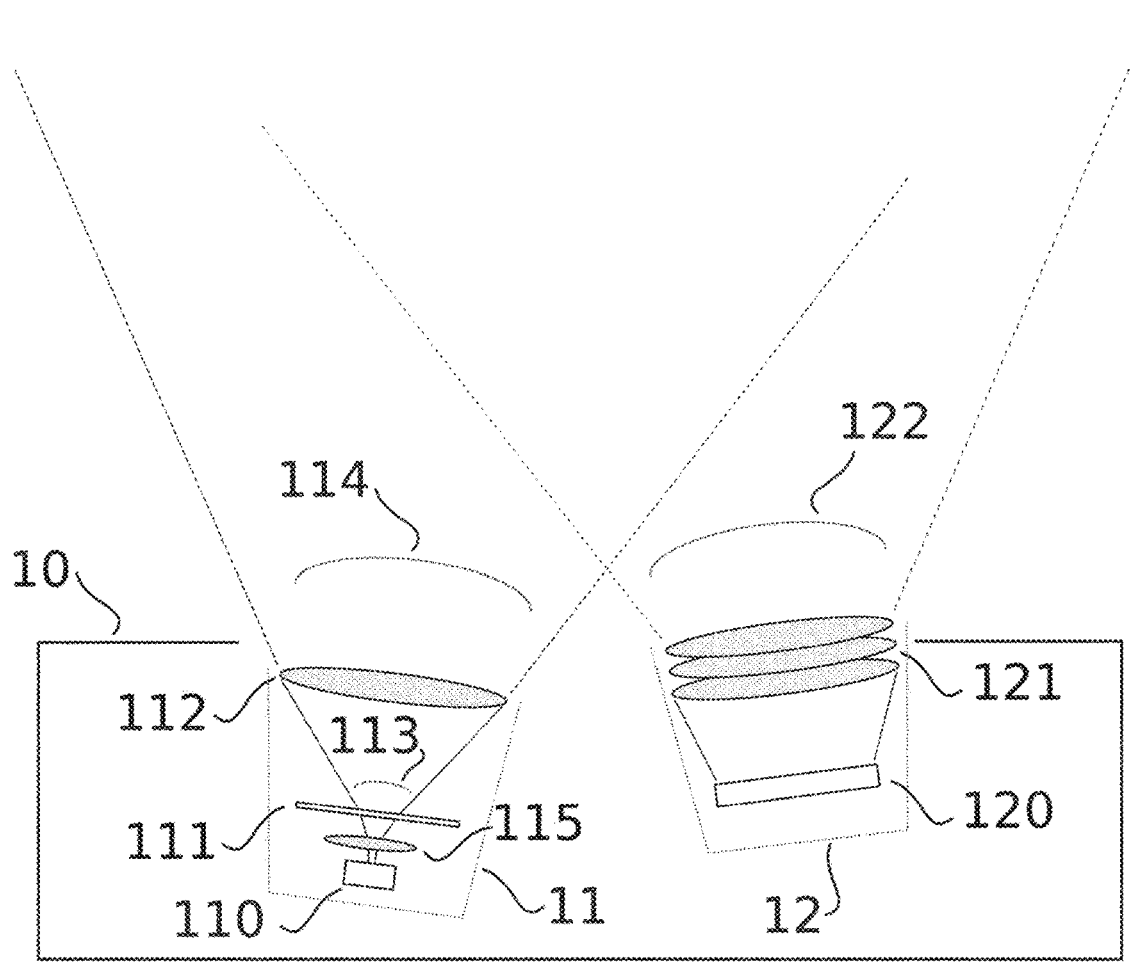
FIG. 2 illustrates an embodiment of the present invention.

With reference to FIG. 2 in a variant of the above mentioned embodiment emitter (11) consists of at least one additional lens (115) (either concave and/or convex) between laser (110) and diffuser (111) in order to adjust the native divergence $\theta'_{laser}$ of the laser. The resulting divergence after said additional lens can be treated as $\theta_{laser}$. In this embodiment distance h thus represents the distance between the virtual image of the laser (110), with respect to said additional lens, and the diffuser (111).

It will be understood by those skilled in the art that the present invention is not limited to the embodiments illustrated above and that many modifications and additions may be made without departing from the scope of the invention as defined in the appending claims.

The invention claimed is:

1. A remote sensing device comprising
    a detector with a predefined field of view (FOV); and
    an emitter configured to emit continuous light or pulses of light and having a subtended angle of more than 5 mrad as perceived by an observer when the emitter is situated in its most restrictive eye-safe position relative to said observer, so that the light intensity of the emitted light complies with the eye safety regulations described in the IEC 60825-2014 eye safety requirements, said emitter having a divergence angle $\theta_{div}$ in a retinal hazard region and further comprising
    at least one diffuser providing a divergence angle $\theta_0$ after the diffuser; and
    at least one lens configured to transform the light from said diffuser to a determined divergence angle matching the FOV of the detector, or to a virtual image of predefined size appropriate in magnitude given said divergence angle $\theta_{div}$ of the emitter in order to ensure the most restrictive position regarding eye safety to be at the same position for pulsed or quasi-continuous or continuous wave operation; and to emit the transformed light.

2. A remote sensing device according to claim 1 wherein the divergence angle $\theta_{div}$ of the emitter is equal to the divergence angle $\theta_0$ after the diffuser.

3. A remote sensing device according to claim 1 wherein the detector consists of a photo-sensitive element and a lens stack.

4. A remote sensing device according to claim 3 wherein the photo-sensitive element is a CCD camera or a CMOS camera or a SPAD-based detector or an APD-based detector or a SiPM-based detector.

5. A remote sensing device according to any claim 1 wherein said lens is a spherical lens or an aspherical lens or a lens made up of a grid of micro-lenses or a Fresnel lens.

6. A remote sensing device according to claim 1 wherein the diffuser presents the divergence angle $\theta_0$ after the diffuser $\theta_0 > 53° = 0.93$ rad.

7. A remote sensing device according to claim 1 wherein it further comprises at least one additional lens positioned between the emitter and the diffuser.

8. A remote sensing device according to claim 7 wherein said additional lens is a concave or convex lens.

9. A remote sensing device according to claim 1 wherein the emitter consists of a laser which emits at least one wavelength corresponding to the retinal hazard region 400 nm<$\lambda$≤1400 nm.

10. A smartphone comprising a remote sensing device further comprising
    a detector with a predefined field of view (FOV); and
    an emitter configured to emit continuous light or pulses of light and having a subtended angle of more than 5 mrad as perceived by an observer when the emitter is situated in its most restrictive eye-safe position relative to said observer, so that the light intensity of the emitted light complies with the eye safety regulations described in the IEC 60825-2014 eye safety requirements, the emitted light having a divergence angle $\theta_{div}$ in a retinal hazard region which further comprises at least one diffuser providing a divergence angle $\theta_0$ after the diffuser; and at least one lens configured to transform the light from said diffuser to a determined divergence angle matching the FOV of the detector, or to a virtual image of predefined size appropriate in magnitude given the divergence angle $\theta_{div}$ of the emitter in order to ensure the most restrictive position regarding eye safety to be at the same position for pulsed or quasi continuous or continuous wave operation; and to emit the transformed light.

11. A smartphone according to claim 10 wherein the divergence angle $\theta_{div}$ of the emitter is equal to the divergence angle $\theta_0$ after the diffuser.

12. A smartphone according to claim 10 wherein the detector consists of a photo-sensitive element and a lens stack.

13. A smartphone according to claim 12 wherein the photo-sensitive element is a CCD camera or a CMOS camera or a SPAD-based detector or an APD-based detector or a SiPM-based detector.

14. A smartphone according to claim 10 wherein said lens is a spherical lens or an aspherical lens or a lens made up of a grid of micro-lenses or a Fresnel lens.

15. A smartphone according to claim 10 wherein the diffuser presents a divergence angle after the diffuser $\theta_0 > 53° = 0.93$ rad.

16. A smartphone according to claim 10 wherein it further comprises at least one additional lens positioned between the emitter and the diffuser.

17. A smartphone according to claim 16 wherein said additional lens is a concave or convex lens.

18. A smartphone according to any claim 10 wherein the emitter consists of a laser which emits at least one wavelength corresponding to the retinal hazard region 400 nm $< \lambda \leq 1400$ nm.

* * * * *